United States Patent [19]

Blommers et al.

[11] 4,333,970

[45] Jun. 8, 1982

[54] PROCESS FOR PRODUCING COATED BEADS WITH MACROMONOMER-STYRENE POLYMERIZATE COATING

[75] Inventors: Elizabeth A. Blommers, Newtown Square; David R. Warfel, Exton; Alvin R. Ingram, West Chester, all of Pa.

[73] Assignee: Atlantic Richfield Company, Los Angeles, Calif.

[21] Appl. No.: 219,465

[22] Filed: Dec. 23, 1980

[51] Int. Cl.³ .................. B05D 7/00; C08F 212/08; C08F 236/10
[52] U.S. Cl. ................................ 427/222; 428/407; 521/148; 525/258; 526/209; 526/293; 526/346; 526/347; 526/347.1
[58] Field of Search ............. 525/258; 428/407; 427/222; 526/209, 293, 346, 347, 347.1

[56] References Cited

U.S. PATENT DOCUMENTS

| | | | |
|---|---|---|---|
| 4,029,613 | 6/1977 | Quinlan et al. | 428/407 |
| 4,174,425 | 11/1979 | Saito et al. | 526/209 |
| 4,269,871 | 5/1981 | Blommors et al. | 427/222 |
| 4,278,732 | 7/1981 | Spicuzza | 428/407 |

Primary Examiner—Jr. Harry Wong
Attorney, Agent, or Firm—Lewis J. Young

[57] ABSTRACT

Coated beads which exhibit anti-lumping properties upon pre-expansion and which are useful in the formation of soft expanded articles are prepared by coating initial polystyrene beads, in suspension, with a coating composition comprising styrene and a macromonomer of styrene and isoprene or styrene and butadiene, the coating compositions added to the suspension as an aqueous emulsion containing a catalyst and a polyoxyethylene ether of nonylphenol or octylphenol as surfactant.

7 Claims, No Drawings

PROCESS FOR PRODUCING COATED BEADS WITH MACROMONOMER-STYRENE POLYMERIZATE COATING

BACKGROUND OF THE INVENTION

This invention relates to a process for forming styrenic polymer beads which have anti-lumping properties upon pre-expansion and which are useable for producing soft molded products such as packaging material.

The formation of styrene polymer beads is a well known and commercial process. One such process is described in Grim patent, U.S. Pat. No. 2,673,194, the contents of which are incorporated by reference herein. Such styrene polymer beads, upon impregnation with a blowing agent, are expandable to discrete foam particles which can be formed into shaped articles by further expansion and then fusion thereof in contact with steam within the confines of a mold.

A useful property of expanded polystyrene articles is the cushioning effect that such articles provide when used as a packaging material. Attempts have been made to increase, even more, the cushioning properties of polystyrene articles, by enhancing the impact strength and resiliency of the expanded polystyrene used to form such articles. Such attempts include the polymerization of 60-70 parts of styrene within 40-30 parts of pelletized copolymers of ethylene and vinyl acetate. These particles, after impregnation with butane, yield molded foams that are softer, more resilient, and have greater resistance to impact than polystyrene foams. However, because of the fugitivity of the blowing agent, the product must be expanded promptly after its production or stored in pressure-resistant containers at low temperatures.

Polyethylene foams of a density of about two pounds per cubic foot exhibit good impact strength and resiliency but are deficient for some packaging applications because of a tendency to creep and form an enlarged cavity while carrying a relatively light load.

A problem relative to pre-expansion of expandable polystyrene beads before introduction into a mold is the tendency of the pre-expanded particles to clump together and form lumps which render them unsuitable for molding. These lumps cannot be properly conveyed in processing plants and are unsuitable for charging into molds of intricate contour due to improper fill-out of the molded articles. Even if reasonable fill-out is achieved, variations in density within the molded article can result and voids also occur.

Various methods have been proposed for the prevention of lumping during pre-expansion, but these have all suffered from some objectionable feature such as rapid loss of blowing agent, poor flow of the treated beads, dust problems which cause plugging of the steam ports, and often serious reduction in fusion of the particles on molding.

An object of the present invention is to produce expandable styrenic polymer beads which can be packaged, transported, and stored like conventional expandable polystyrene, and which will be usable in forming soft molded articles.

Another object of the present invention is to produce expandable polymer beads which are resistant to lumping upon pre-expansion of the beads.

A further object of the present invention is to provide a process which will produce coated polymer beads which have a shelf life sufficient to permit shipment in containers for conventional expandable polystyrene beads, and will be resistant to lumping upon pre-expansion of the same and will also be useable in the formation of soft molded articles.

SUMMARY OF THE INVENTION

Coated styrenic polymer beads with acceptable storage stability and utility for producing soft foamed articles, and which exhibit anti-lumping properties upon pre-expansion, are produced by forming a suspension of styrenic polymer beads in an aqueous medium and adding thereto, under polymerization conditions, an emulsion which contains a styrenic monomer and a catalyst therefor, and an isoprene or butadiene-styrene macromonomer, the emulsion formed in an aqueous medium containing a polyoxyethyene alkylphenol containing at least thirty moles of ethylene oxide per mole of alkylphenol, the mixture so formed maintained at an elevated temperature so as to form a polymerized coating about the initial styrenic beads.

DETAILED DESCRIPTION

The present invention provides for the formation of a coating of a polymerizate of styrene and a styrene-isoprene or styrene-butadiene macromonomer about styrenic polymer beads to produce beads with acceptable storage stability and which, upon impregnation with a blowing agent and pre-expansion thereof, will exhibit anti-lumping properties and which, upon heating by superatmospheric steam injected into a vented mold, will form soft, shaped styrenic expanded polymeric articles.

The term "styrenic" as used herein is intended to include styrene, alpha-methylstyrene, para-methylstyrene, para-t-butylstyrene, monochlorostyrene and dichlorostyrene, as well as mixtures thereof, when used in conjunction with styrenic polymer beads or styrenic monomer. The formation of initial such styrenic polymer beads is according to known processes and the present invention is directed to a process for forming a coating about such beads to provide coated beads which form soft articles.

These initial styrenic polymer beads are formed into a suspension in an aqueous medium by dispersing the beads in water, containing a finely divided, difficultly water-soluble inorganic phosphate suspending agent such as those described in Grim U.S. Pat. No. 2,673,194, and include tricalcium phosphate, hydroxyapatite, magnesium phosphate, and the like. In addition to the finely divided difficultly water-soluble inorganic phosphate suspending agent, there is added, as is conventional, a modifier therefor also as described in the Grim patent, such as sodium dodecylbenzene sulfonate.

An emulsion is formed containing a coating composition which consists of a major amount of styrenic monomer and a minor amount of a macromolecular monomer or macromonomer of styrene and a conjugated diene such as butadiene, isoprene, 2,3-dimethylbutadiene, chloroprene and piperylene, the preferred conjugated dienes being butadiene and isoprene.

Such conjugated diene-styrene macromonomers, and preparation of the same, are such as described in U.S. Pat. Nos. 3,786,116 and 3,862,101, the contents of which are incorporated by reference herein. The macromonomers preferred are made by polymerizing styrene with an alkyl lithium initiator to a polystyrene of number average molecular weight between 5,000 and 50,000 and then capping the polystyryl chains with first an alkylene oxide and then a methacrylate group. It is the methacrylate group which acts as a copolymerizable monomer moiety. Broader molecular weight distributions than those described in U.S. Pat. No. 3,786,116 are however usable and are obtainable by known variations in temperature of polymerization and the lithium alkyl initiator used.

The emulsion of styrenic monomer and conjugated diene-styrene macromonomer is formed in an aqueous medium and also contains a styrenic monomer catalyst and a nonionic surfactant. The catalyst forming a part of the emulsion comprises a free-radical initiating catalyst which is soluble in the styrenic monomer, such as the known peroxides, benzoyl peroxide and t-butyl perbenzoate, in conventional amounts.

The styrenic monomer, conjugated diene-styrene macromonomer, and monomer-soluble catalyst are emulsified in an aqueous medium by the use of specific nonionic surfactants. The nonionic surfactants usable in the present process are ethylene oxide condensates of an octyl or nonylphenol, and the nonionic surfactant must contain at least 30 moles of ethylene oxide per mole of said alkylphenol. Particular useful nonionic surfactants are a polyoxyethylene(50) ether of nonylphenol sold under the name of Igepal CO-970, and a polyoxyethylene(100) ether of nonylphenol sold under the name of Igepal CO-990. Use of other surfactants, either nonionic or other, or even the use of polyoxyethylene nonylphenol surfactants having less than about thirty moles of ethylene oxide per mole of nonylphenol have been found unsatisfactory because of excessive bead clustering and/or formation of fine, powdery polymer.

The particular surfactants are added to the catalyst-styrene-conjugated diene-styrene macromonomer-water mixture in an amount of 0.1 to 1.0 weight percent, based upon the amount of water in the emulsion to be formed, with about 0.5 percent by weight preferred.

The amount of styrenic monomer and conjugated diene-styrene macromonomer present in the emulsion will depend upon the amount of the coating to be formed about the initial styrenic polymer beads but should be such that the final beads produced comprise 50–98 percent by weight the initial styrenic beads and 2–50 percent by weight of the coating. The coating itself should be formed from a mixture of styrenic monomer and conjugated diene-styrene macromonomer such that the coating also comprises from 75–98 percent by weight of styrenic monomer and 2–25 percent by weight of the conjugated diene-styrene macromonomer.

The aqueous emulsion of styrenic monomer and conjugated diene-styrene macromonomer, containing a free radical catalyst and the specified nonionic surfactant, may be formed as an emulsion in a single vessel and added therefrom to the aqueous suspension of styrenic polymer beads.

The aqueous emulsion of styrenic monomer, conjugated diene-styrene macromonomer and catalyst, containing the nonionic surfactant, is added to the aqueous suspension of styrenic polymer beads, over a period of about one hour, with the suspension maintained at an elevated temperature, such as about 90° C., with stirring. The suspension is then further heated, with stirring, at about 90° C. for a sufficient time period, such as about three to six hours, so as to effect polymerization of the monomers about the beads.

The time of addition, temperature, and time of additional heating to effect polymerization may be varied, dependent upon the amount and type of styrenic monomer used and the thickness and hardness of the coating desired about the styrenic beads.

The beads, so produced, are then impregnated with an expanding agent such as a gas or an agent which will produce a gas on heating, such as aliphatic hydrocarbons containing from 4 to 6 carbon atoms in the molecule, such as butane, pentane, cyclopentane, hexane, cyclohexane and the halogenated hydrocarbons which boil at a temperature below the softening point of the polymer. The expanding agents, which are conventional, may be incorporated by conventional processes, for example, that described in U.S. Pat. No. 2,983,692.

The present invention is further illustrated in the following examples, wherein parts and percentages are parts and percentages by weight unless otherwise indicated.

EXAMPLE I

For this example, a first conjugated diene-styrene macromonomer was prepared according to the method described in U.S. Pat. No. 3,862,101, as follows:

A one-gallon stirred reactor was charged with 2,400 g of purified cyclohexane and heated to 60° C. A trace of diphenylethylene (0.2 g) was added to the cyclohexane by means of a hypodermic needle. A solution of sec-butyllithium in cyclohexane was added to the reactor portion-wise until a permanent orange-yellow color was obtained. The solution was then backtitrated with cyclohexane until the color just disappeared. The solvent and reactor were now ready for the polymerization of monomer. Into the closed reactor was charged 16.97 mmole of sec-butyllithium and 200 g styrene and the reactor held at 60° C. for 15 minutes. At this point, 466.5 g of isoprene was added to the reactor and the mixture held for 45 minutes to complete the polymerization of the isoprene. The macromonomer (diblock copolymer) thus formed was analyzed by refractive index and found to be 30% by weight styrene and 70% by weight isoprene. There was then added 50 mmole ethylene oxide followed by 34 mmole of methacryloyl chloride. The final macromonomer was separated from the solvent and used as a macromonomer in the coating composition described below.

A second conjugated diene-styrene macromonomer was also prepared according to the above procedure but the amounts varied such that the diblock copolymer contained 40% by weight styrene and 60% by weight isoprene. The final macromonomer was separated from the solvent and this macromonomer also used as a macromonomer in a coating composition described below.

The macromonomers were used to coat polystyrene beads with a 10 percent by weight coating formed on the beads, the coating consisting of 85 percent by weight polystyrene and 15 percent by weight of the respective macromonomer.

To a 2-liter resin kettle having a hot air bath surrounding the same, an agitator, an air reflux condensor, two combination thermowell baffles and a monomer emulsion feed port in the dome of the kettle, there was added 445-g of distilled water, 1.0 g of tricalcium phosphate, 5 ml of a 0.1% aqueous solution of sodium dodecylbenzene sulfonate (Ultrawet K), and 450 g of polystyrene beads which had a weight average molecular weight of 215,000 and were of a size that passed through a 16-mesh sieve and were retained on a 30-mesh sieve.

The slurry so produced was heated to 70° C. and during 2 minutes there was added 20 g of an emulsion of dyed styrene [100-g styrene containing 0.05 g of Perox Violet 3B, an oil soluble violet dye which does not affect polymerization, with 25 ml of 0.5% Igepal CO-990] [polyoxyethylene (100) ether of nonylphenol]. Stirring was continued for ten minutes. The dyed styrene permitted observation of the uniformity of distribution of monomer. Over two minutes at 70° C. there was then added 20 g of an emulsion containing styrene, the macromonomer and catalyst [25 g of a solution (21.3 g of dyed styrene, 3.7 g of the macromonomer, 0.438 g of benzoyl peroxide and 0.063 g of t-butyl perbenzoate) mixed with 25 ml of 0.5% Igepal 00-990]. The mixture was stirred for 1.25 hr at 70° C. There was then added 60 g of an emulsion containing uncatalyzed styrene and the macromonomer [a solution of 8.0 g of the macromonomer dissolved in 32.0 g of dyed styrene) mixed with 40 ml of 0.5% Igepal CO-990], over a period of one hour while heating from 70° to 90°. The mixture was stirred an additional 4 hours at 90° C. to harden the beads. The slurry was then transferred to a series of 12 oz. (crown cap) bottles and heated 4 hours at 115° C. The bead slurry was acidified, washed well with water, and air dried.

The beads were impregnated with n-pentane by charging to each of a series of 12 oz. crown cap bottles, 100 g of coated beads, 3.0 g tricalcium phosphate, 0.03 g Ultrawet-K, 100 g of distilled water and 8.5 g of n-pentane. The bottles were capped and heated for three hours at 115° C. The bottles were then cooled to room temperature, opened, the contents acidified to a pH of 1.8 or less with hydrochloric acid, and the beads separated by centrifuging, and air dried.

A control was provided for comparison purposes comprising the uncoated polystyrene beads impregnated with n-pentane in a similar manner.

A portion of the beads were pre-expanded by heating for two minutes in an upward flow of steam injected at a line pressure of 5 lb/in$^2$ gauge. A weighed portion of the expanded beads were then screened through a 4-mesh sieve and the percent lumping determined by weighing the residue of fused pieces on the screen. The results of the expansion test are listed in Table I:

TABLE I

| Sample | 85/15 Styrene-Isoprene Macromonomer Copolymer Coating on Beads (%) | Styrene (S)-Isoprene (I) Macromonomer In Coating (15%) | 2-Minute Expansion | |
|---|---|---|---|---|
| | | | DENSITY (lb/ft.$^3$) | LUMPING (%) |
| 1 | None | Not Coated | 1.19 | 80 |
| 2 | 10 | 30S/70I | 1.49 | 0 |
| 3 | 10 | 40S/60I | 1.36 | 0 |

After overnight aging, the expanded beads were steam-molded into cylindrical foams 8 inches in diameter and 2 inches in thickness. Two-inch cubical specimens were cut and compressed by 30% according to ASTM Method D-695. Results of these tests are listed in Table II:

TABLE II

| | Compression | | |
|---|---|---|---|
| Sample | Modulus (lb/in$^2$) | Compressive Failure (lb/in$^2$) | Set[1] (%) |
| 1 | 503 | 17 | 16.8 |
| 2 | 239 | 16 | 9.4 |
| 3 | 334 | 18 | 11.5 |

[1]24 hours after recovery from 30% compression.

The greater softness and resiliency of the molded coated bead foams were readily apparent to the touch. These properties were confirmed quantitatively by their reduced modulus and compressive set in comparison with the data for the uncoated bead foams.

EXAMPLE II

In this example, a conjugated diene-styrene macromonomer was prepared, according to the preparation described in Example I, except that the macromonomer was formed from styrene and butadiene. The macromonomer contained 30 percent styrene and 70 percent butadiene. This macromonomer was then used to coat polystyrene beads according to the process of Example I, except that, instead of the final heating for 4 hours at 115° C., the polymerization was completed by heating 2 hours at 115° C. followed by 3 hours at 135° C. The n-pentane impregnated beads, upon pre-expansion, gave only 15% lumping. Molded articles produced from coated beads were tested as in Example I, with the results of the tests listed in Table III. Additionally, the creep characteristics of the foams were determined in comparison with uncoated bead foams:

TABLE III

| 85/15 Styrene-Macromonomer Copolymer Coating on Beads % | Styrene (S)-Butadiene (B) Macromonomer | Foam Density (lb/ft$^3$) | Compression | | | Creep[1] | | | |
|---|---|---|---|---|---|---|---|---|---|
| | | | Modulus (lb/in$^2$) | Compressive Failure (lb/in$^2$) | Set (%) | 1 Day | 5 Days | 12 Days | 30 Days |
| 0 | — | 1.19 | 503 | 17 | 16.8 | 1.5 | 1.7 | 1.7 | — |
| 10 | 30S/70B | 0.88 | 256 | 16 | 10.7 | 2.2 | 2.2 | — | 2.6 |

[1]% decrease in Thickness of a 2-inch cubical speciman under load of 2lb/in$^2$.

Beads coated with either the isoprene or butadiene type of styrene macromonomer exhibited little difference in loss rate of blowing agent in comparison with expandable uncoated polystyrene beads at the same volatile content. Thus, the coated expandable beads for soft foams required no special conditions for drying and storage.

We claim:

1. A process for forming coated styrenic polymer beads which exhibit anti-lumping properties upon preexpansion and which are useful in producing soft foamed articles comprising:
   (a) forming an aqueous suspension of initial styrenic polymer beads with the aid of a finely divided, difficulty water-soluble, inorganic phosphate suspending agent and a modifier therefore;
   (b) forming an emulsion containing a coating composition, consisting of a major amount of a styrenic monomer and a minor amount of a conjugated diene-styrene macromonomer, which is an anionically prepared polymer of molecular weight between 5000 and 50,000 terminated with a reactive monofunctional polymerizable group, and containing a styrenic monomer-soluble free-radical-producing catalyst; in an aqueous medium containing a nonionic surfactant comprising an ethylene oxide condensate of an alkylphenol, selected from octylphenols and nonylphenols, said surfactants containing at least thirty moles of ethylene oxide per mole of alkylphenol;

(c) adding said emulsion to said styrenic polymer bead suspension to form a mixture thereof, while maintaining the suspension at an elevated temprature; and maintaining the mixture so formed at an elevated temperature to cause said coating composition to polymerize and form a coating about said initial styrene beads.

2. The process as defined in claim 1 wherein said conjugated diene-styrene macromonomer comprises a macromonomer of styrene and isoprene terminated by a methacrylyl group.

3. The process as defined in claim 1 wherein said conjugated diene-styrene macromonomer comprises a macromonomer of styrene and butadiene terminated by a methacrylyl group.

4. The process as defined in claim 1 wherein said initial styrenic polymer beads are produced from a styrenic monomer selected from the group consisting of styrene, alpha-methylstyrene, para-methylstyrene, para-t-butylstyrene, monochlorostyrene and dichlorostyrene.

5. The process as defined in claim 1 wherein said styrenic monomer is selected from the group consisting of styrene, alpha-methylstyrene, para-methylstyrene, para-t-butylstryene, monochlorostyrene and dichlorostyrene.

6. The process as defined in claim 1 wherein the coating formed about said initial beads comprises 2-50 percent by weight of said coated styrene polymer beads.

7. The process as defined in claim 1 wherein the coating formed about said beads comprises from 75-98 percent by weight of said styrenic monomer and 2-25 percent by weight of said conjugated diene-styrene macromonomer.

* * * * *